(12) United States Patent
Saka

(10) Patent No.: US 7,866,454 B2
(45) Date of Patent: Jan. 11, 2011

(54) TORQUE CONVERTER

(75) Inventor: Tokimori Saka, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 729 days.

(21) Appl. No.: 11/847,787

(22) Filed: Aug. 30, 2007

(65) Prior Publication Data
US 2008/0173510 A1  Jul. 24, 2008

(30) Foreign Application Priority Data

Sep. 25, 2006 (JP) .............................. 2006-258598
Sep. 25, 2006 (JP) .............................. 2006-258599

(51) Int. Cl.
*F16H 45/02* (2006.01)
*F16D 33/18* (2006.01)

(52) U.S. Cl. ................... 192/3.3; 192/45.1; 192/110 B; 60/345

(58) Field of Classification Search ..................... 60/345
See application file for complete search history.

(56) References Cited

U.S. PATENT DOCUMENTS

| | | | |
|---|---|---|---|
| 5,822,987 A | * | 10/1998 | Tsukamoto et al. ............ 60/441 |
| 6,568,180 B2 | * | 5/2003 | Maeda et al. .................. 60/345 |
| 6,675,941 B1 | | 1/2004 | Arhab et al. |

| | | | |
|---|---|---|---|
| 2001/0052233 A1 | | 12/2001 | Maeda et al. |

FOREIGN PATENT DOCUMENTS

| | | |
|---|---|---|
| JP | 2004270808 A | 9/2004 |
| JP | 2005299830 A | 10/2005 |
| JP | 2006-118654 | 5/2006 |
| JP | 2006138429 A | 6/2006 |
| WO | 0123779 A1 | 4/2001 |

OTHER PUBLICATIONS

European Patent Office, Extended European Search Report for European Patent Application No. 07 115 362.1-1254.

* cited by examiner

*Primary Examiner*—Richard M. Lorence
(74) *Attorney, Agent, or Firm*—Brooks Kushman P.C.

(57) ABSTRACT

A torque converter includes at least two thrust bearings disposed on respective axially-opposite sides of a radially-inward portion of a stator. The stator includes a non-rotatable member, a rotatable member, and a one-way clutch. The rotatable member has a cylindrical portion having an inner peripheral surface interlocked with the one-way clutch, and an extension portion which extends from an approximately axially-central region of the cylindrical portion in a radially-outward direction relative to the cylindrical portion, and has an axial thickness less than that of the cylindrical portion. The thrust bearings are disposed to clamp the extension portion from respective axially-opposite sides of the extension portion at respective positions located radially outwardly relative to the cylindrical portion, so as to facilitate reduction in axial dimension of the torque converter.

16 Claims, 2 Drawing Sheets

TORQUE CONVERTER

BACKGROUND OF THE INVENTION

1. Field of the Invention

The present invention relates to a torque converter comprising a torque input member, a torque output member, a pump impeller, a turbine runner and a stator, wherein the torque converter is designed to circulate fluid between respective ones of the pump impeller, the turbine runner and the stator so as to transmit torque from the torque input member to the torque output member through the fluid, and more particularly to a distinctive technique of reducing an axial dimension of such a torque converter.

2. Background Art

Heretofore, there has been known a torque converter comprising a torque input member, a torque output member, a pump impeller interlocked with the torque input member, a turbine runner disposed in opposed relation to the pump impeller and interlocked with the torque output member, and a stator having a bladed portion (hereinafter referred to as "stator blade portion") disposed between respective inner peripheral portions of the pump impeller and the turbine runner, wherein the torque converter is designed to circulate fluid between respective ones of the pump impeller, the turbine runner and the stator blade portion (i.e., circulate fluid along a torus flow circuit defined by the pump impeller, the turbine runner and the stator blade portion) so as to transmit torque from the torque input member to the torque output member through the fluid.

For example, in a torque converter for use in automobiles, the torque input member and the torque output member are connected to an engine and a speed change mechanism of an automatic transmission, respectively. In this case, a power train between the engine and the automatic transmission is serially arranged and is thereby apt to have a relatively long overall length. Recent years, there has been a growing need for downsizing an engine compartment serving as a mounting space of a power train. In connection with this need, it has been increasingly required to accelerate reduction in overall length of a power train and therefore reduction in axial dimension of a torque converter.

For example, as a technique of reducing an axial dimension of a torque converter, JP 2006-118654A discloses a hydraulic torque converter. This torque converter includes a lockup clutch mechanism for mechanically connecting a torque input member (front cover) directly to a torque output member (turbine hub), and a damper device for absorbing fluctuations in torque to be transmitted from the torque input member to the torque output member during engagement of the lockup clutch mechanism. The torque converter is intended to improve a layout of the turbine hub and the damper device so as to reduce an axial dimension of the torque converter.

In the above torque converter, a one-way clutch is provided on the side of an inner peripheral portion of a stator, and two thrust bearings are disposed on respective axially-opposite sides of the inner peripheral portion of the stator at respective positions located axially outwardly relative to the one-way clutch, to receive a thrust force acting on the stator.

In view of meeting the increasing need for reducing an axial dimension of a torque converter, it is strongly desired to develop more effective downsizing techniques.

SUMMARY OF THE INVENTION

It is an object of the present invention to provide a torque converter meeting the above need.

In order to achieve this object, the present invention provides a torque converter which includes a torque input member, a torque output member, a pump impeller interlocked with the torque input member, a turbine runner disposed in opposed relation to the pump impeller and interlocked with the torque output member, a stator having a stator blade portion disposed between respective inner peripheral portions of the pump impeller and the turbine runner, and at least two thrust bearings disposed on respective axially-opposite sides of an inner peripheral portion of the stator to receive a thrust force acting on the stator, wherein the torque converter is designed to circulate fluid between respective ones of the pump impeller, the turbine runner and the stator blade portion so as to transmit torque from the torque input member to the torque output member through the fluid. The torque converter is characterized in that the stator comprises: an approximately annular-shaped non-rotatable member installed relative to a support base of the torque converter in a rotation-inhibited manner; a rotatable member approximately annularly disposed around an outer peripheral portion of the non-rotatable member; and a one-way clutch interposed between the non-rotatable member and the rotatable member to support the rotatable member in such a manner as to allow the rotatable member to be rotated in only one direction relative to the non-rotatable member. In this torque converter, the rotatable member includes a cylindrical portion having an inner peripheral surface interlocked with the one-way clutch, and an extension portion which extends from an approximately axially-central region of the cylindrical portion in a radially-outward direction relative to the cylindrical portion, and has an axial thickness less than that of the cylindrical portion. Further, the thrust bearings are disposed to clamp the extension portion from respective axially-opposite sides of the extension portion at respective positions located radially outwardly relative to the cylindrical portion.

The above and other objects, features and advantages of the invention will become more apparent upon reading the following detailed description along with the accompanying drawings.

DETAILED DESCRIPTION OF THE PREFERRED EMBODIMENTS OF THE INVENTION

Figure 1:
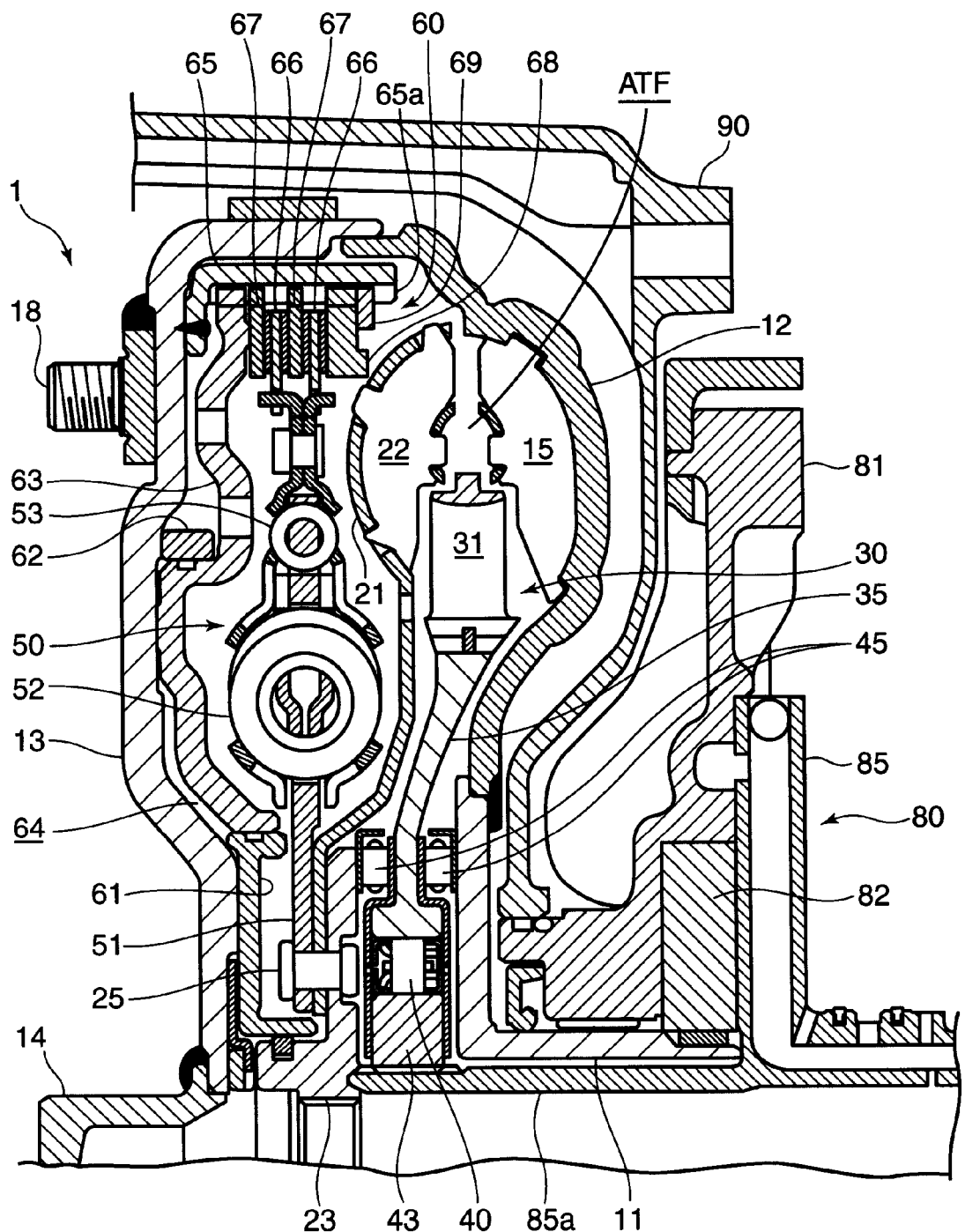
FIG. 1 is an upper half of a vertical sectional view showing a torque converter according to one embodiment of the present invention and peripheral components associated therewith.

With reference to the drawings, an embodiment of the present invention will be described. FIG. 1 is an upper half of a vertical sectional view showing a torque converter according to one embodiment of the present invention and peripheral components associated therewith. The torque converter 1 according this embodiment is designed for use with an automatic transmission for automobiles. Thus, the torque converter 1 is interposed between an engine and a speed change mechanism (typically comprising a planetary gear mechanism and a plurality of clutches) of an automatic transmission, to transmit drive power. In FIG. 1, the engine and the speed change mechanism of the automatic transmission are disposed on a left side and a right side of the torque converter 1, respectively. In the following description, for the sake of simplicity, the left side (engine-side) and the right side (automatic transmission-side) in FIG. 1 will be referred to as "front side" and "rear side", respectively. Further, as to a rotation direction, the same direction as that of an engine rotation, and a direction opposite to the engine rotation, will be referred to as "normal rotation direction" and "reverse rotation direction", respectively.

The torque converter 1 is housed in a transmission case (hereinafter abbreviated as "T/M case") 90 serving as a support base thereof. In this embodiment, an oil pump (hereinafter abbreviated as "O/P") 80 is disposed on a rear side of the torque converter 1.

The torque converter 1 primarily comprises a torque input element, a torque output element, a stator element (stator 30 and an associated member), a lockup clutch 60 and a lockup clutch damper 50.

The torque input element includes a torque input member (front cover 13) and an associated member rotated together with (i.e., interlocked with) the torque input member. The front cover 13 has a plurality of bolts 18 fixed thereto to protrude frontwardly and arranged in a concentric pattern. The bolts 10 are connected to a crankshaft of the engine through a drive plate (not shown). That is, the front cover 13 is adapted to be rotated together with the crankshaft.

The associated member of the torque input element includes a front cover boss 14 oil-tightly joined to an inner peripheral portion of the front cover 13 to form a front wall of the torque converter in cooperation with the front cover 13, an impeller shell 12 oil-tightly joined to an outer peripheral portion of the front cover 13, and an impeller sleeve 11 oil-tightly joined to an inner peripheral portion of the impeller shell 12 to form a rear wall of the torque converter in cooperation with the impeller shell 12. The front cover 13, the front cover boss 14, the impeller shell 12 and the impeller sleeve 11 are joined together to form a shell structure for pooling a working fluid. In this embodiment, a conventional automatic transmission fluid (ATF) is used as the working fluid.

The impeller shell 12 has a radially-outward portion which is partly curved rearwardly, and a pump impeller 15 having a plurality of pump blades (plate-shaped curved blades) arranged in a concentric pattern is fixed to an inner (front) surface of the curved portion.

The impeller sleeve 11 has a cylindrical-shaped inner peripheral portion extending rearwardly and having a rear end engaged with a pump rotor 82 of the O/P 80. The cylindrical portion of the impeller sleeve 11 is rotatably supported relative to the T/M case 90 by an O/P housing 81.

The torque output element includes a torque output member (turbine hub 23) and an associated member rotated together with (i.e., interlocked with) the torque output member. Although not illustrated, a turbine shaft (serving as an input shaft of the speed change mechanism of the automatic transmission) is splined to an inner peripheral surface of the turbine hub 23.

As the associated member of the torque output element, a turbine shell 21 is fixed to the turbine hub 23 by a plurality of rivets 25 arranged in a concentric pattern. The turbine shell 21 has a radially-outward portion which is partly curved frontwardly, and a turbine runner 22 having a plurality of turbine blades (plate-shaped curved blades) arranged in a concentric pattern is fixed to an inner (rear) surface of the curved portion. As illustrated in FIG. 1, the turbine runner 22 is disposed in opposed relation to the pump impeller 15.

The stator element includes a stator 30 and two thrust bearings 45 disposed on respective front and rear sides of a radially-inward portion of the stator 30. The stator element will be specifically described later with reference to FIG. 2.

The lockup clutch (hereinafter abbreviated as "L/U clutch") 60 is a clutch for mechanically connecting (locking up) the torque input member (front cover 13) directly to the torque output. member (turbine hub 23). In this embodiment, the L/U clutch 60 is a wet-type multiple-disc clutch which has relatively high controllability and high torque transmissibility. The L/U clutch 60 is adapted to lock up the front cover 13 to the turbine hub 23 through the lockup clutch damper (hereinafter abbreviated as "L/U damper") 50.

The L/U clutch 60 includes a cylindrical-shaped clutch hub drum 65 which has an outer peripheral surface fixed to the front cover 13 and an inner peripheral surface formed with a spline 65a, a disc-shaped lockup (L/U) piston 63 adapted to be moved along the spline 65a within the clutch hub drum 65 in a frontward/rearward direction, and an inner drum 61 and an outer drum 62 which support the L/U piston 63 at respective predetermined positions of inner and outer peripheral surfaces of the L/U piston 63, in a slidingly movable manner through a sealing member provided therebetween. A region surrounded by the front cover 13, the L/U piston 63, the inner drum 61 and the outer drum 62 is defined as an oil pressure chamber 64 of a working oil for operating the L/U piston 63 (in this embodiment, the same ATF as that for the torque converter 1 is used as the working oil for operating the L/U piston 63).

The clutch hub drum 65 is provided with: two pressure plates 67 which are axially disposed on a rear side of the L/U piston 63 and associated with two friction plates 66 alternately arranged relative to the first friction plates 67; a retaining plate 68 disposed on a rear side of the rear friction plate 66; and a snap ring 69 which locks a rear end of the retaining plate 68.

Each of the pressure plates 67 and the retaining plate 68 is an annular-shaped metal plate having an outer peripheral portion engaged with the spline 65a of the clutch hub drum 65. That is, each of the pressure plates 67 and the retaining plate 68 is adapted to be rotated together with the clutch hub drum 65 and the front cover 13 integral with clutch hub drum 65.

Each of the friction plates 66 disposed between the front and rear pressure plates 67 or between the rear pressure plate 67 and the retaining plate 68 is an annular-shaped metal plate having opposite surfaces each provided with a friction member thereon. Each of the friction plates 66 has an inner peripheral portion engaged with a damper body 51 of the lockup clutch damper 50. The damper body 51 is fixed to the turbine hub 23 together with the turbine shell 21 by the aforementioned rivets 25. That is, each of the friction plates 66 is adapted to be rotated together with the damper body 51 and the turbine hub 23 integral with the damper body 51.

The lockup clutch damper 50 is interposed between the front cover 13 and the turbine hub 23 in such a manner as to allow a lockup state between the front cover 13 and the turbine hub 23 to be achieved during engagement of the L/U clutch 60 while absorbing fluctuations in torque to be transmitted from the front cover 13 to the turbine hub 23.

The lockup clutch damper 50 includes the damper body 51, a plurality of damper springs (hereinafter abbreviated as "damper SPGs") 52, and a plurality of stopper springs (hereinafter abbreviated as "stopper SPGs") 53. The lockup clutch damper 50 is disposed on one of axially-opposite sides of the stator 30 (in this embodiment, on a front side of the stator) in axially parallel relation to the stator 30. The damper body 51 is formed as two plate-shaped members consisting of a radially-inward plate member and a radially-outward plate member. As mentioned above, the radially-inward plate member is fixed to the turbine hub 23, and the radially-outward plate member is engaged with the friction plated 66. The damper SPGs 52 and the stopper SPGs 53 are interposed between the radially-inward plate member and the radially-outward plate member of the damper body 51 to absorb fluctuations in torque to be transmitted from the radially-inward plate member to the radially-outward plate member, according to a cushioning action of the damper and stopper SPGs.

In this embodiment, a damper spring having a size greater than a standard size of conventional damper springs is used as the damper SPG 52 to provide enhanced torque-fluctuation absorbing performance. In connection with an increase in size of the damper SPG 52, the turbine shell 21 is formed to be curved rearwardly in a vicinity of the damper SPGs 52 so as to ensure an installation space therefor.

As shown in FIG. 1, the O/P is disposed on the rear side of the torque converter 1. The O/P 80 serves as a source for the working fluid ATF in the torque converter 1 and an oil pressure to be supplied and released to/from the oil pressure chamber 64 of the L/U clutch 60. The O/P 80 also serves as an oil pressure source for the clutches of the speed change mechanism (not shown).

The O/P 80 includes the oil pump (O/P) housing 81, an oil pump (O/P) cover 85 and the pump rotor 82. The O/P housing 81 is fixed to the T/M case 90, and formed to house the pump rotor 82. Although not illustrated, the O/P housing 81 is formed with an oil inlet port, an oil outlet port, and an oil passage extending from the oil inlet port to the oil outlet port via the pump rotor 82.

The pump rotor 82 is connected to the rear end of the impeller sleeve 11 and driven by the impeller sleeve 11. According to rotation of the pump rotor 82, an ATF introduced from the oil inlet port (not shown) is pressurized and then discharged from the oil outlet port (not shown).

The O/P cover 85 is fixed to the O/P housing 81 to serve as a cover which defines a housing for the pump rotor 82 in cooperation of the O/P housing 81. Although not described in detail, the O/P cover 85 is formed with an oil passage for the clutches of the speed change mechanism. As shown in FIG. 1, the O/P cover 85 has a cylindrical-shaped inner peripheral portion 85a protruding frontwardly along an inner peripheral surface of the impeller sleeve 11. The inner peripheral portion 85a of the O/P cover 85 is splined to a one-way clutch (OWC) inner race 43 of the stator 30 in a vicinity of a front end thereof, to support the OWC inner race 43 in a rotation-inhibited manner.

Figure 2:
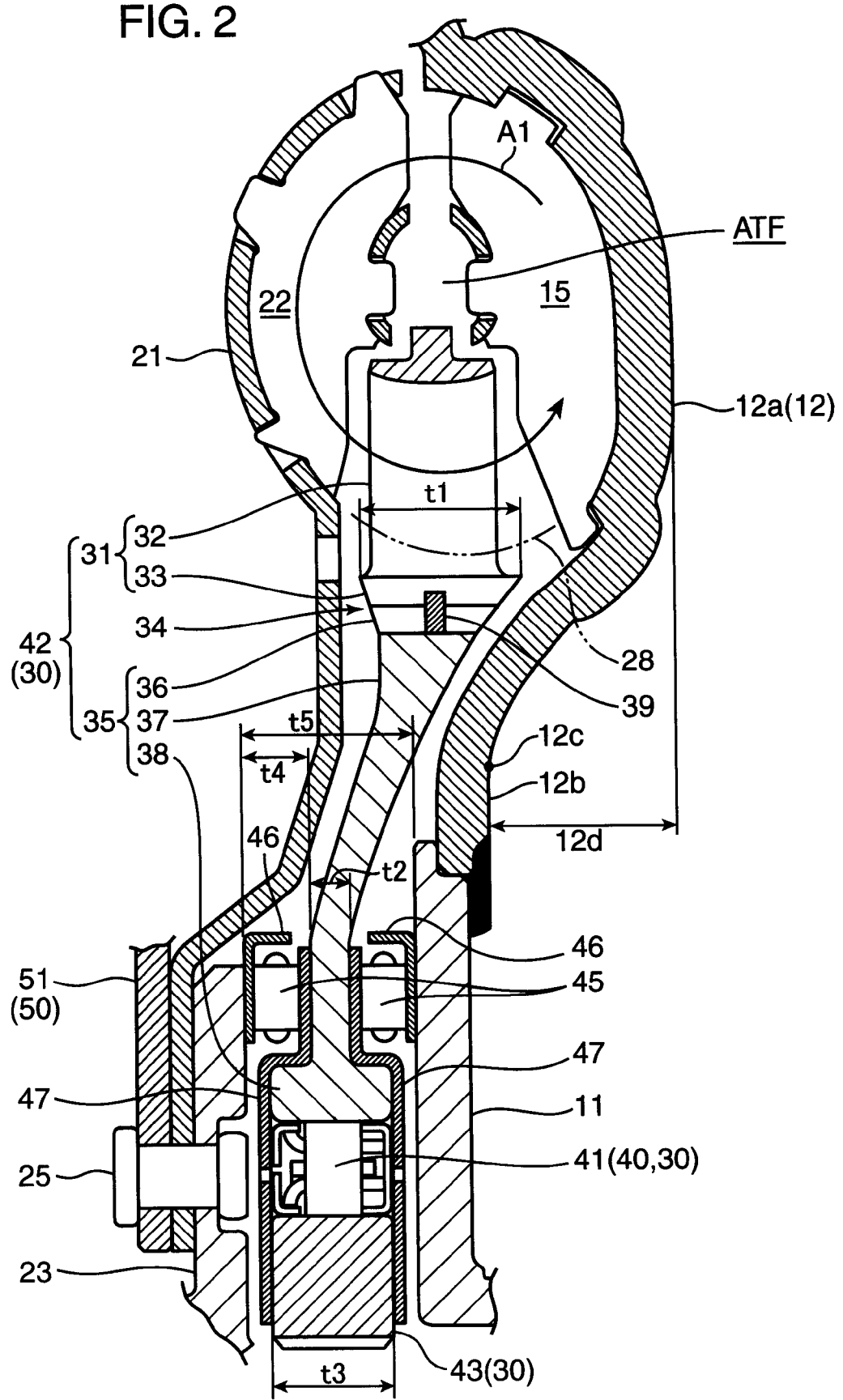
FIG. 2 is a fragmentary enlarged view of the torque converter in FIG. 1.

FIG. 2 is a fragmentary enlarged view of the torque converter 1 in FIG. 1. In particular, FIG. 2 specifically shows the impeller shell 12, the turbine shell 21 and the stator element. With reference to FIG. 2, the torque converter 1 according to this embodiment will be more specifically described below.

The stator 30 is disposed between the impeller shell 12 and the turbine shell 21. The stator has a stator blade portion 32 disposed between respective inner peripheral portions of the pump impeller 15 and the turbine runner 22, and supports the stator blade portion 32 in such a manner as to be allow the stator blade portion 32 to be rotated about a rotation axis in only one direction (in only a normal rotation direction).

The stator blade portion 32 is an outer peripheral portion of the stator 30 having a plurality of stator blades (plate-shaped curved blades) arranged in a concentric pattern. As shown in FIG. 2, the pump impeller 15, the turbine runner 22 and the stator blade portion 32 define a torus flow circuit 28 around which a working fluid ATF is circulated.

In order to adequately define the torus flow circuit 28, a radially-outward portion of the impeller shell 12 corresponding to the torus flow circuit 28 is formed as a bulging portion 12a which bulges (curves) rearwardly relative to a radially-inward portion (hereinafter referred to as "reference portion") 12b. Specifically, the bulging portion 12a is formed to bulge rearward by a distance 12d relative to a bulge reference point 12c located at a predetermined position of the reference portion 12b. In other words, an axial position of the reference portion 12b is formed to protrude frontwardly relative to a rearmost position in the bulging portion 12a by the distance 12d. This distance 12d is significantly greater than that of a conventional torque converter, so that an inner (front) surface of the reference portion 12b is located to radially overlap the stator blade portion 32.

Thus, in a radially-outward region (corresponding to the torus flow circuit 28) of the torque converter 1, a desired torus flow circuit having an adequate axial thickness can be reliably ensured. Further, in a radially-inward region (i.e., a region on a radially-inward side relative to the torus flow circuit 28, particularly a region on a radially-inward side relative to the reference portion 12b) of the torque converter 1, an axial length can be drastically reduced as compared with that of the radially-outward region.

The stator 30 primarily comprises the OWC inner race 43 located on a radially-inward side, an approximately annular-shaped rotatable member 42 located on a radially-outward side relative to the OWC inner race 43, and a one-way clutch (OWC) 40 which is interposed between the OWC inner race 43 and the rotatable member 42 to support the rotatable member 42 in such a manner as to allow the rotatable member 42 to be rotated in only one direction (i.e., in only a normal rotation direction) relative to the OWC inner race 43.

The OWC inner race 43 is splined to the oil pump cover 85 through the inner peripheral surface thereof, as shown in FIG. 1. That is, the OWC inner race 43 serves as a non-rotatable member which is supported relative to the T/M case 90 by the oil pump cover 85 and the O/P housing 81 in a rotation-inhibited manner.

The rotatable member 42 comprises a radially-outward component 31 which includes the stator blade portion 32 and has an inner peripheral portion formed as a splined portion 33 (first connection portion), and a radially-inward component 35 which has an outer peripheral portion formed as a splined portion 36 (second connection portion) connected to the splined portion 33. The splined portion 33 and the splined portion 36 are splined together, and an axial relative displacement therebetween is locked by a snap ring 39 (axial-displacement stopper member) to define a connection region 34 where the radially-outward component 31 and the radially-inward component 35 are connected together. The connection using the snap ring 39 makes it possible to facilitate an operation of connecting the radially-outward component 31 and the radially-inward component 35.

The connection region 34 is disposed at a radial position which is located radially outwardly relative to the bulge reference point 12c, and radially inwardly relative to an inwardmost position of the torus flow circuit 28. Preferably, the connection region 34 is disposed on a radially-outwardmost position to such an extent that no adverse effect is exerted on smooth flow of the ATF (a position closer to the torus flow circuit 28). Each of the splined portions 33, 36 defining the connection region 34 has an inner periphery with an axial thickness less than that of an outer periphery thereof.

The radially-outward component 31 is made of a material having a relatively low strength. Preferably, the material of the radially-outward component 31 is a resin or a light metal, such as aluminum or magnesium. The radially-outward component 31 has a predetermined thickness t1 which is determined based on a desired configuration of the stator blade portion 32. Thus, in terms of strength, the radially-outward component 31 is not essentially required to have the thickness t1. That is, the radially-outward component 31 dimensionally has a margin in strength. Therefore, a relatively low-strength material can be used as long as a required strength is obtained. This is also advantageous to obtaining higher formability (productivity) while ensuring a required strength, as compared with the use of a higher-strength material.

The radially-inward component 35 comprises a cylindrical portion 38 located on a radially-inward side and formed with an inner peripheral surface engaged with the OWC 40, and a disc-shaped extension portion 37 which extends radially outwardly from an approximately axially-central region of the cylindrical portion 38 and has an axial thickness less than that of the cylindrical portion 38. The cylindrical portion 38 and the extension portion 37 are integrally formed in a single piece.

The extension portion 37 has a largest thickness (largest axial length) in the splined portion 36, i.e., a radially-outwardmost portion, and the thickness gradually decreases in a radially inward direction. Then, the extension portion 37 has a smallest thickness t2 in a connection region with the cylindrical portion 38 (at a predetermined position of the radially-inward component 35 located radially inwardly relative to the connection region 34).

The extension portion 37 (or the radially-inward component 35) has an outer periphery which is offset rearwardly relative to an inner periphery thereof (i.e., offset relative to the inner periphery in a direction axially away from the L/U damper 50).

The reference portion 12b of the impeller shell 12 is formed to largely protrude frontwardly, as mentioned above. Further, the turbine shell 21 is formed to curve rearwardly in a radial position corresponding to that of the reference portion 12b. Thus, an installation space for the extension portion 37 defined between the impeller shell 12 and the turbine shell 21 is most narrowed in a radial direction in a vicinity of the reference portion 12b, and this most narrowed space is offset frontwardly relative to an axial position of the stator blade portion 32. In this embodiment, despite the disadvantage in installation space, the above offset arrangement or configuration makes it possible to desirably arrange the extension portion 37 so as to successfully reduce an axial dimension of the torque converter 1.

The radially-inward component 35 is formed separately from the radially-outward component 31, using structural steel having a relatively high strength as a material thereof. Specifically, carbon steel (e.g., S30C to S50C), chromium steel (e.g., SCr420) or chromium-molybdenum steel (e.g., SCM420) is preferably used as a material of the radially-inward component 35. Further, the material may be subjected to a surface treatment, such as quenching, carburizing or nitriding, according to need. The surface treatment makes it possible to minimize a thickness of the extension portion 37 while ensuring a required strength thereof.

Each of the splined portions 33, 36 is formed to have the inner periphery with an axial thickness less than that of the outer periphery, as mentioned above. This allows the connection region 34 to have a sufficient strength in an outer periphery thereof and facilitate downsizing in an inner periphery thereof.

The cylindrical portion 38 is formed to have a thickness (axial length) t3 which is equal to the thickness of the OWC inner race 43 or the OWC 40. The cylindrical portion 38 has an inner peripheral surface serving as a one-way clutch outer race (hereinafter abbreviated as "OWC outer race") engaged with an engagement element 41 of the OWC 40. In this embodiment, the OWC 40 is a so-called sprag type, and the engagement element 41 is a sprag.

The OWC 40 receives a reaction force to a fluid force acting on the stator blades in the stator blade portion 32, i.e., receives a large torque. Thus, the OWC 40 is required to have a certain level of axial length (thickness t3) for ensuring a strength enough to receive such a large torque. The cylindrical portion 38 serving as the OWC outer race is formed to have the same thickness t3 as that of the OWC 40, and made of high-strength structural steel. Thus, the cylindrical portion 38 can adequately carry out a function of the OWC outer race.

The inner peripheral surface of the cylindrical portion 38 used as the OWC outer race makes it possible to achieve structural simplicity without the need for an OWC outer race as a separate component.

Two thrust bearings 45 are disposed in a step region of the extension portion 37 adjacent to a boundary between the cylindrical portion 38 and the extension portion 37 to clamp the extension portion 37 from respective front and rear sides thereof. Specifically, the front thrust bearing 45 is interposed between the turbine hub 23 and the extension portion 37 through front and rear bearing races 46, 47. The rear thrust bearing 45 is interposed between the impeller sleeve 11 and the extension portion 37 through rear and front bearing races 46, 47. The thrust bearings 45 serve as means to fix the stator 30 at an intended axial position, and receive a thrust force acting on the stator 30 (stator blade portion 32).

Given that a thickness of the front or rear thrust bearing 45 including the two bearing races 46, 47 is t4, an axial distance t5 between the front thrust bearing 45 and the rear thrust bearing 45 is expressed as follows: t5=t2+(2×t4). This distance becomes less than a distance [t3+(2×t4)] in a conventional structure where an extension portion 37 is formed to extend from the cylindrical portion 38 without a step region, and the thrust bearings 45 are disposed in a region of the extension portion having a thickness t3. That is, an axial dimension around the thrust bearings 45 can be further reduced by reducing a thickness of the extension portion 37 to form a step region between the cylindrical portion 38 and the extension portion 37, and arranging the thrust bearings 45 in the step region.

An operation of the torque converter 1 will be described below. The operation will be first described on the assumption that the L/U clutch 60 is disengaged (L/U OFF), and a rotation speed of the turbine hub 23 (turbine runner 22) is low relative to a rotation speed of the front cover 13 (pump impeller 15) (i.e., a speed ratio is relatively low). This state appears during stop of a vehicle (a rotation speed of the turbine hub 23=zero) or just after start of the vehicle.

During the L/U OFF, there is a small clearance between the pressure plate 67/the retaining plate 68 and the friction plate 66, and thereby the pressure plate 67/the retaining plate 68 can be rotated relative to the friction plate 66. That is, the front cover 13 as the torque input member can be rotated relative to the turbine hub 23 as the torque output member.

In this state, a flow direction of the working fluid ATF in the torus flow circuit 28 is as follows: the pump impeller 15→the turbine runner 22→the stator blade portion 32→the pump impeller 15, as indicated by the arrow A1 in FIG. 2. Actually, a circumferential flow (flow in a direction perpendicular to the drawing sheet) is added to the above flow to form a three-dimensional flow. A torque input in the torque input member is transmitted to the ATF from the pump impeller 15, and then transmitted to the torque output member through the turbine runner 22. The ATF returned from the turbine runner 22 to the stator blade portion 32 flows in a direction causing a rotation of the stator blade portion 32 in a reverse rotation direction. However, the reverse rotation is inhibited by the OWC 40. Thus, the stator blade portion 32 (rotatable member 42) is kept in its stop state, and operates to change the flow direction of the ATF so as to return the ATF to the pump impeller 15.

The ATF changed in flow direction and returned to the pump impeller 15 acts to accelerate a circulating flow (arrow A1) so as to transmit enhanced torque to the turbine runner 22. Thus, the turbine hub 23 as the torque output member can obtain a larger torque than that in the front cover 13 as the torque input member (torque-amplifying action).

The following description will be made on the assumption that the L/U clutch 60 is disengaged, and the rotation speed of the turbine hub 23 (turbine runner 22) is high relative to the rotation speed of the front cover 13 (pump impeller 15) (i.e., a speed ratio is relatively high). This state appears when a vehicle speed reaches a certain value after start of the vehicle or during a low-load steady driving condition.

In this state, the working fluid ATF also forms the following circulating flow in the torus flow circuit 28: the pump impeller 15→the turbine runner 22→the stator blade portion 32→the pump impeller 15. However, differently from the above case, the ATF returned from the turbine runner 22 to the stator blade portion 32 flows in a direction causing a rotation of the stator blade portion 32 in a normal rotation direction. The normal rotation of the stator blade portion 32 is permitted by the OWC 40, and thereby the stator blade portion 32 (rotatable member 42) is rotated in the normal rotation direction in the same manner as the pump impeller 15 and the turbine runner 22. Thus, a fluid coupling devoid of the torque-amplifying action is formed in the torus flow circuit 28, so that the turbine hub 23 as the torque output member can obtain a torque slightly less than that in the front cover 13 as the torque input member.

The following description will be made on the assumption that the L/U clutch 60 is engaged (L/U ON). This state appears when a vehicle speed reaches a certain value after start of the vehicle and a control unit (not shown) issues a L/U command.

In response to the L/U command, an oil pressure is supplied to the oil pressure chamber 64 to move the L/U piston 63 rearwardly. Thus, the pressure plates 67 and the friction plates 66 are pressed against the rearwardmost retaining plate 68 to preclude a relative movement between the pressure plates 67 and the friction plates 66 based on a frictional force acting therebetween (i.e., to achieve an engagement state). That is, a directly-connected state (L/U state) is established between the front cover 13 and the turbine hub 23.

As compared with a power transmission through fluid, the L/U state advantageously provides higher transmission efficiency without fluid slip. Thus, a wider range of the L/U state greatly contributes to improvement in fuel economy. From this point of view, in this embodiment, a L/U range fairly wider than a conventional L/U range (e.g., a high-speed range in 4th gear or more) is set (e.g., a L/U range initiating just after start of a vehicle in 1st gear). A wet-type multiple-disc clutch which has relatively high controllability and high torque transmissibility is employed as the L/U clutch 60 to cope with the wider L/U range.

During the L/U ON, a torque transmission from the front cover 13 to the turbine hub 23 is performed through the L/U damper 50, and torque fluctuations are absorbed by the L/U damper 50. Relatively low torque fluctuations can be adequately absorbed only by the damper SPGs 52, and relatively large torque fluctuations are intensively absorbed by a combination of the damper SPGs 52 and the stopper SPGs 53.

In this embodiment, the L/U state is initiated from a low gear range, as mentioned above. Generally, relatively large torque fluctuations occur in a low gear range (low vehicle speed range). Thus, if the L/U state is initiated from the low gear range, the torque fluctuations are likely to increase vibrations of vehicle body and cause deterioration in ride quality. In this embodiment, the large-size damper SPG 52 having high torque-absorbing performance is employed to eliminate such a risk.

An advantage to reducing an axial length of a radially-inward region of the torque converter 1 will be described below. As shown in FIG. 1, the O/P housing 81 has a configuration in which a radially-inward wall largely protrudes frontwardly, and a front end of the radially-inward wall is located frontwardly relative to the rear end of the impeller shell 12. This configuration is allowed by increasing the distance 12*d* (see FIG. 2) between the rearmost position and the reference portion 12*b* of the impeller shell 12.

In view of a combinational arrangement of the torque converter 1 and the O/P 80, a total axial length of the torque converter 1 and the O/P 80 can be reduced by allowing a part (protruding portion) of the O/P 80 to be received in a space created based on the downsized radially-inward region of the torque converter 1, as compared with an arrangement where the O/P 80 is simply disposed on a rear side of the torque converter 1 (disposed rearwardly relative to the rear end of the impeller shell 12).

As above, the present invention has been described based on a specific embodiment thereof. It is understood that various modifications and changes may be made therein without departing from the sprit and scope of the present invention. For example, the structure of the L/U clutch 60 and the structure of the L/U damper 50 are not limited to those in the above embodiment, but any other suitable type may be used.

Further, the OWC 40 is not limited to the sprag type, but any other suitable type, such as a roller type, may be used. In this case, the engagement element 41 is a roller.

The component to be arranged around the torque converter 1 is not limited to that in the above embodiment. For example, a component other than the O/P 80 may be disposed on a rear side of the torque converter 1 in such a manner as to be partly received in a space created by the downsized radially-inward region of the torque converter 1. It is understood that the present invention is not limited to the above layout where a part (or entirety) of a certain member or component is received in a space created by the downsized radially-inward region of the torque converter 1.

As described based on the above specific embodiment, the present invention provides a torque converter which includes a torque input member, a torque output member, a pump impeller interlocked with the torque input member, a turbine runner disposed in opposed relation to the pump impeller and interlocked with the torque output member, a stator having a stator blade portion disposed between respective inner peripheral portions of the pump impeller and the turbine runner, and at least two thrust bearings disposed on respective axially-opposite sides of an inner peripheral portion of the stator to receive a thrust force acting on the stator, wherein the torque converter is designed to circulate fluid between respective ones of the pump impeller, the turbine runner and the stator blade portion so as to transmit torque from the torque input member to the torque output member through the fluid. The torque converter is characterized in that the stator comprises: an approximately annular-shaped non-rotatable member installed relative to a support base of the torque converter in a rotation-inhibited manner; a rotatable member approximately annularly disposed around an outer peripheral portion of the non-rotatable member; and a one-way clutch interposed between the non-rotatable member and the rotatable member in such a manner as to allow the rotatable member to be rotated in only one direction relative to the non-rotatable member. In this torque converter, the rotatable member includes a cylindrical portion having an inner peripheral surface interlocked with the one-way clutch, and an extension portion which extends from an approximately axially-central region of the cylindrical portion in a radially-outward direction relative to the cylindrical portion, and has an axial thickness less than that of the cylindrical portion. Further, the thrust bearings are disposed to clamp the extension portion from respective axially-opposite sides of the extension portion at respective positions located radially outwardly relative to the cylindrical portion.

The above torque converter of the present invention makes it possible to reduce an axial length of a radially-inward region thereof (at least a region of the extension portion of the stator corresponding to the positions of the thrust bearings) so as to facilitate downsizing, as described in detail below.

In the cylindrical portion of the stator, an axial length necessary as a portion to be interlocked with the one-way clutch (OWC) can be ensured. The OWC receives a reaction force to a fluid force acting on the stator blade portion, i.e., receives a large torque. Thus, the OWC is required to have a certain level of thickness (axial length) for ensuring a strength enough to receive such a large torque. The cylindrical portion in the rotatable member of the stator has a relatively long axial length as compared with the extension portion. Thus, the cylindrical portion can be adequately interlocked with the OWC.

The extension portion is a member for connecting the radially-inward cylindrical portion and the radially-outward stator blade portion to allow torque to be transmitted therebetween. The extension portion is not essentially required to have the same thickness as that of the cylindrical portion. Further, the extension portion may be appropriately made of a high-strength material to fairly reduce a thickness (axial length) as compared with the cylindrical portion. The reduction in thickness of the extension portion makes it possible to form a difference in axial length (step region) between the cylindrical portion and the extension portion. In the present invention, the step region is equally provided on respective axially-opposite sides of the extension portion, and the thrust bearings are arranged therein.

This configuration and arrangement make it possible to absorb a part of a thickness of the thrust bearings by the step region so that an axial length between one of the thrust bearings and the other bearing becomes less than a simple sum of a thickness of two thrust bearings and an axial length of the cylindrical portion. In this manner, the axial length can be reduced to facilitate downsizing.

In view of a reduction in axial dimension of a torque converter, it is not to say that only a reduction in overall length thereof has an advantage, but a reduction in axial dimension of a radially-inward region of the torque converter as in the present invention also has an advantage. As mentioned above, the torque converter is essentially interposed between a torque input-side mechanism (engine etc.) and a torque output-side mechanism (speed change mechanism etc.) in a power transmission system (power train etc.). Thus, even in a reduction in axial dimension of a part of the torque converter, such as radially-inward region, an overall length of the entire system can be reduced by arranging a part of the system in such a manner as to be received in a vacant space created by the reduction in axial dimension.

In the torque converter of the present invention, the rotatable member may comprise a radially-outward component which includes the stator blade portion and has an inner peripheral portion formed as a first connection portion, and a radially-inward component which includes the cylindrical portion and the extension portion, and has an outer peripheral portion formed as a second connection portion connected to the first connection portion. The radially-inward component may be made of structural steel.

In this torque converter, the radially-outward component including the stator blade portion can be made of a relatively low-strength material (e.g., resin or light metal) to ensure enhanced formability, and the radially-inward component including the extension portion can be made of structural steel as a relatively high-strength material to sufficiently reduce a thickness thereof, so as to further effectively reduce the axial dimension.

Specifically, carbon steel, chromium steel or chromium-molybdenum steel is preferably used as the structural steel. Further, the structural steel may be effectively subjected to a surface treatment, such as quenching, carburizing or nitriding, according to need.

In the above torque converter, the first connection portion and the second connection portion may be splined together, and an axial relative displacement therebetween may be inhibited by an axial-displacement stopper member.

This makes it possible to readily connect the two separate components, i.e., the radially-outward component and the radially-inward component, together, through the first and second connection portions.

In the above torque converter, the cylindrical portion may have an inner peripheral surface serving as a one-way clutch outer race in contact with an engagement element of the one-way clutch.

The inner peripheral surface of the cylindrical portion used as the OWC outer race makes it possible to achieve structural simplicity without the need for an OWC outer race as a separate component. In the OWC receiving a large torque as mentioned above, the OWC outer race is required to have a high strength. In the present invention, the radially-inward component including the cylindrical portion is made of structural steel. By utilizing this feature, the cylindrical portion is directly used as the OWC outer race.

When the torque converter of the present invention further includes a lockup clutch adapted to mechanically connect the torque input member directly to the torque output member, and a lockup clutch damper adapted to absorb fluctuations in torque to be transmitted from the torque input member to the torque output member during engagement of the lockup clutch, the lockup clutch damper may be disposed on one of axially-opposite sides of the stator in axially parallel relation to the stator, and the rotatable member may have an outer periphery which is offset relative to an inner periphery thereof in a direction axially away from the lockup clutch damper.

In this torque converter, the lockup clutch damper can be disposed in a space created by axially offsetting the outer periphery of the radially-inward component relative to the inner periphery thereof. This makes it possible to efficiently utilize the space in the torque converter so as to facilitate the reduction in axial dimension.

When the torque converter of the present invention is adapted to circulate fluid along a torus flow circuit defined by the pump impeller, the turbine runner and the stator blade portion so as to transmit torque from the torque input member to the torque output member, the pump impeller may be supported by an impeller shell which has a radially-outward portion allowing the pump impeller to define a part of the torus flow circuit. The radially-outward portion may be formed to bulge axially outwardly relative to a bulge reference point located at a predetermined position of a radially-inward reference portion of the impeller shell. Further, the rotatable member may comprise a radially-outward component which includes the stator blade portion and has an inner peripheral portion formed as a first connection portion, and a radially-inward component which has an outer peripheral portion formed as a second connection portion connected to the first connection portion. The radially-inward component may be made of a material having a strength greater than that of the radially-outward component. A connection region defined by the first connection portion and the second connection portion may be disposed at a radial position which is located radially outwardly relative to the bulge reference point, and radially inwardly relative to an inwardmost position of the torus flow circuit, and the radially-inward component may have an axial thickness less than that of the connection region, at a predetermined position of the radially-inward component located radially inwardly relative to the connection region.

In this torque converter, the radially-outward portion of impeller shell can be formed to ensure a desired thickness of the torus flow circuit. Particularly, as to the stator, a thickness required for a function of the stator blade portion can be ensured, and enhanced formability can be achieved by using a relatively low-strength material (e.g., resin or light metal).

The radially-inward component of the stator is made of a relatively high-strength material to allow a thickness (i.e., axial length) thereof to be reduced while ensuring a desired strength, so as to facilitate reduction in axial dimension of the torque converter.

In the above torque converter, at least either one of the first connection portion and the second connection portion may have an inner periphery with an axial thickness less than that of an outer periphery thereof.

This makes it possible to ensure a strength of the connection region (radially-outward portion) and facilitate the reduction in axial dimension (of the radially-inward portion).

This application is based on Japanese Patent Application Serial Nos. 2006-258598 and 2006-258599 filed with Japan Patent Office both on Sep. 25, 2006, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications will be apparent to shoes skilled in the art. Therefore, unless otherwise such changes and modifications depart from the scope of the present invention hereinafter defined, they should be construed as being included therein.

What is claimed is:

1. A torque converter comprising:
   a torque input member;
   a torque output member;
   a pump impeller interlocked with said torque input member;
   a turbine runner disposed in opposed relation to said pump impeller and interlocked with said torque output member;
   a stator having a stator blade portion disposed between respective inner peripheral portions of said pump impeller and said turbine runner; and
   a pair of thrust bearings disposed on respective axially-opposite sides of an inner peripheral portion of said stator to receive a thrust force acting on said stator,
   wherein said torque converter is designed to circulate fluid between respective ones of said pump impeller, said turbine runner and said stator blade portion so as to transmit torque from said torque input member to said torque output member through said fluid,
   said torque converter being characterized in that said stator comprising:
   an annular-shaped non-rotatable member installed relative to a support base of said torque converter in a rotation-inhibited manner;
   a rotatable member approximately annularly disposed around an outer peripheral portion of said non-rotatable member; and
   a one-way clutch interposed between said non-rotatable member and said rotatable member to support said rotatable member in such a manner as to allow said rotatable member to be rotated in only one direction relative to said non-rotatable member,
   wherein said rotatable member including:
   a cylindrical portion having an inner peripheral surface interlocked with said one-way clutch, and
   an extension portion which extends from an approximately axially-central region of said cylindrical portion in a radially-outward direction relative to said cylindrical portion, and has an axial thickness less than that of said cylindrical portion, wherein the axial thickness of said extension portion gradually decreases in a radially-inward direction toward said cylindrical portion with the axial thickness of said extension portion being smallest in a connection region with said cylindrical portion whereby a step region between said extension portion and said cylindrical portion is provided on respective axially-opposite sides of said extension portion; and
   said thrust bearings are arranged in the step region and disposed to clamp said extension portion from said respective axially-opposite sides of said extension portion at respective positions located radially outwardly relative to said cylindrical portion.

2. The torque converter as defined in claim 1, wherein said rotatable member comprising:
   a radially-outward component which includes said stator blade portion and has an inner peripheral portion formed as a first connection portion; and
   a radially-inward component which includes said cylindrical portion and said extension portion, and has an outer peripheral portion formed as a second connection portion connected to said first connection portion, said radially-inward component being made of structural steel.

3. The torque converter as defined in claim 2, wherein said first connection portion and said second connection portion are splined together, and an axial relative displacement therebetween is inhibited by an axial-displacement stopper member.

4. The torque converter as defined in claim 2, wherein said cylindrical portion has an inner peripheral surface serving as a one-way clutch outer race in contact with an engagement element of said one-way clutch.

5. The torque converter as defined in claim 1, further comprising:
   a lockup clutch adapted to mechanically connect said torque input member directly to said torque output member; and
   a lockup clutch damper adapted to absorb fluctuations in torque to be transmitted from said torque input member to said torque output member during engagement of said lockup clutch, said lockup clutch damper being disposed on one of axially-opposite sides of said stator in axially parallel relation to said stator, wherein said rotatable member has an outer periphery which is offset relative to an inner periphery thereof in a direction axially away from said lockup clutch damper.

6. The torque converter as defined in claim 1, wherein said torque converter is adapted to circulate fluid along a torus flow circuit defined by said pump impeller, said turbine runner and said stator blade portion so as to transmit torque from said torque input member to said torque output member, wherein:

said pump impeller is supported by an impeller shell which has a radially-outward portion allowing said pump impeller to define a part of said torus flow circuit, said radially-outward portion being formed to bulge axially outwardly relative to a bulge reference point located at a predetermined position of a radially-inward reference portion of said impeller shell; and said rotatable member including:
a radially-outward component having:
said stator blade portion and
an inner peripheral portion formed as a first connection portion; and
a radially-inward component having:
an outer peripheral portion formed as a second connection portion connected to said first connection portion, said radially-inward component being made of a material having a strength greater than that of said radially-outward component; and
a connection region which is defined by said first connection portion and said second connection portion is disposed at a radial position which is located radially outwardly relative to said bulge reference point, and radially inwardly relative to an innermost position of said torus flow circuit; and
wherein said radially-inward component has an axial thickness less than that of said connection region, at a predetermined position of said radially-inward component located radially inwardly relative to said connection region.

7. The torque converter as defined in claim 6, wherein at least either one of said first connection portion and said second connection portion has an inner periphery with an axial thickness less than that of an outer periphery thereof.

8. The torque converter as defined in claim 7, wherein said radially-inward component is made of structural steel.

9. The torque converter as defined in claim 7, wherein said first connection portion and said second connection portion are splined together, and an axial relative displacement therebetween is inhibited by an axial-displacement stopper member.

10. The torque converter as defined in claim 6, wherein said radially-inward component has an inner peripheral surface serving as a one-way clutch outer race in contact with an engagement element of said one-way clutch.

11. The torque converter as defined in claim 6, further comprising:
a lockup clutch adapted to mechanically connect said torque input member directly to said torque output member; and
a lockup clutch damper adapted to absorb fluctuations in torque to be transmitted from said torque input member to said torque output member during engagement of said lockup clutch, said lockup clutch damper being disposed on one of axially-opposite sides of said stator in axially parallel relation to said stator, wherein said radially-inward component has an outer periphery which is offset relative to an inner periphery thereof in a direction axially away from said lockup clutch damper.

12. The torque converter as defined in claim 1, further comprising:
a pair of bearing races respectively interposed between the thrust bearings and the corresponding sides of the extension portion, wherein said non-rotatable member includes an inner race of said one-way clutch and said bearing races extend radially inwardly so as to cover at least part of said inner race to thereby prevent an engagement element of said one-way clutch from axial displacement.

13. The torque converter as defined in claim 1, wherein said extension portion offsets axially rearwardly relative to said cylindrical portion as said extension portion extends from said cylindrical portion in the radially-outward direction relative to said cylindrical portion.

14. A torque converter comprising:
a torque input member;
a torque output member;
a pump impeller interlocked with said torque input member;
a turbine runner disposed in opposed relation to said pump impeller and interlocked with said torque output member;
a stator having a stator blade portion disposed between respective inner peripheral portions of said pump impeller and said turbine runner; and
a pair of thrust bearings disposed on respective axially-opposite sides of an inner peripheral portion of said stator to receive a thrust force acting on said stator,
wherein said torque converter is designed to circulate fluid between respective ones of said pump impeller, said turbine runner, and said stator blade portion so as to transmit torque from said torque input member to said torque output member through said fluid,
said torque converter being characterized in that said stator comprising:
an annular-shaped non-rotatable member installed relative to a support base of said torque converter in a rotation-inhibited manner;
a rotatable member approximately annularly disposed around an outer peripheral portion of said non-rotatable member; and
a one-way clutch interposed between said non-rotatable member and said rotatable member to support said rotatable member in such a manner as to allow said rotatable member to be rotated in only one direction relative to said non-rotatable member,
wherein said rotatable member including:
a cylindrical portion having an inner peripheral surface interlocked with said one-way clutch, and
an extension portion which extends from an approximately axially-central region of said cylindrical portion in a radially-outward direction relative to said cylindrical portion, and has an axial thickness less than that of said cylindrical portion; and
said thrust bearings are disposed to clamp said extension portion from respective axially-opposite sides of said extension portion at respective positions located radially outwardly relative to said cylindrical portion,
wherein said torque converter is adapted to circulate fluid along a torus flow circuit defined by said pump impeller, said turbine runner, and said stator blade portion so as to transmit torque from said torque input member to said torque output member, wherein:

said pump impeller is supported by an impeller shell which has a radially-outward portion allowing said pump impeller to define a part of said torus flow circuit, said radially-outward portion being formed to bulge axially outwardly relative to a bulge reference point located at a predetermined position of a radially-inward reference portion of said impeller shell; and said rotatable member including:
- a radially-outward component having:
  - said stator blade portion and
  - an inner peripheral portion formed as a first connection portion; and
- a radially-inward component having:
  - an outer peripheral portion formed as a second connection portion connected to said first connection portion, said radially-inward component being made of a material having a strength greater than that of said radially-outward component; and
- a connection region which is defined by said first connection portion and said second connection portion is disposed at a radial position which is located radially outwardly relative to said bulge reference point, and radially inwardly relative to an inwardmost position of said torus flow circuit; and wherein said radially-inward component has an axial thickness less than that of said connection region, at a predetermined position of said radially-inward component located radially inwardly relative to said connection region, wherein the axial thickness of said radially-inward component decreases radially-inwardly and is smallest at a portion corresponding to the thrust bearings.

15. The torque converter as defined in claim 14, further comprising:

a pair of bearing races respectively interposed between the thrust bearings and the corresponding sides of the extension portion, wherein said non-rotatable member includes an inner race of said one-way clutch and said bearing races extend radially inwardly so as to cover at least part of said inner race to thereby prevent an engagement element of said one-way clutch from axial displacement.

16. The torque converter as defined in claim 14, wherein said extension portion offsets axially rearwardly relative to said cylindrical portion as said extension portion extends from said cylindrical portion in the radially-outward direction relative to said cylindrical portion.

* * * * *